R. E. GAINES.
SPRING.
APPLICATION FILED JUNE 4, 1920.
1,393,618.
Patented Oct. 11, 1921.
2 SHEETS—SHEET 1.
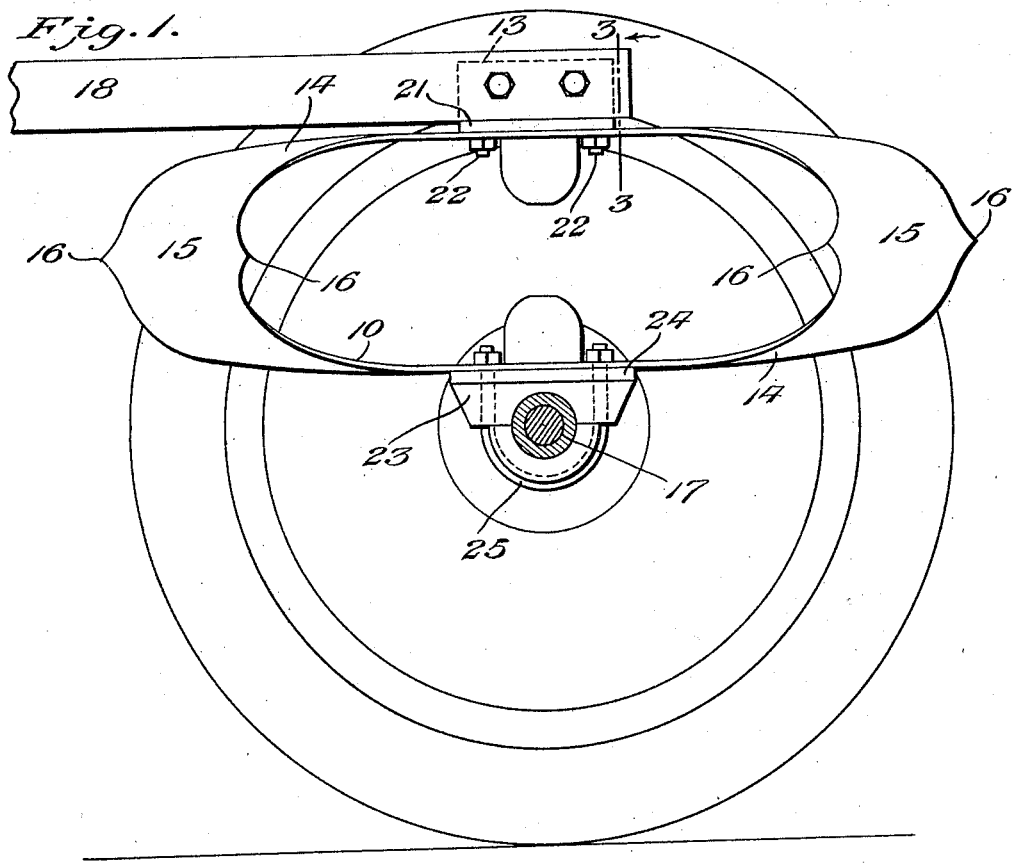
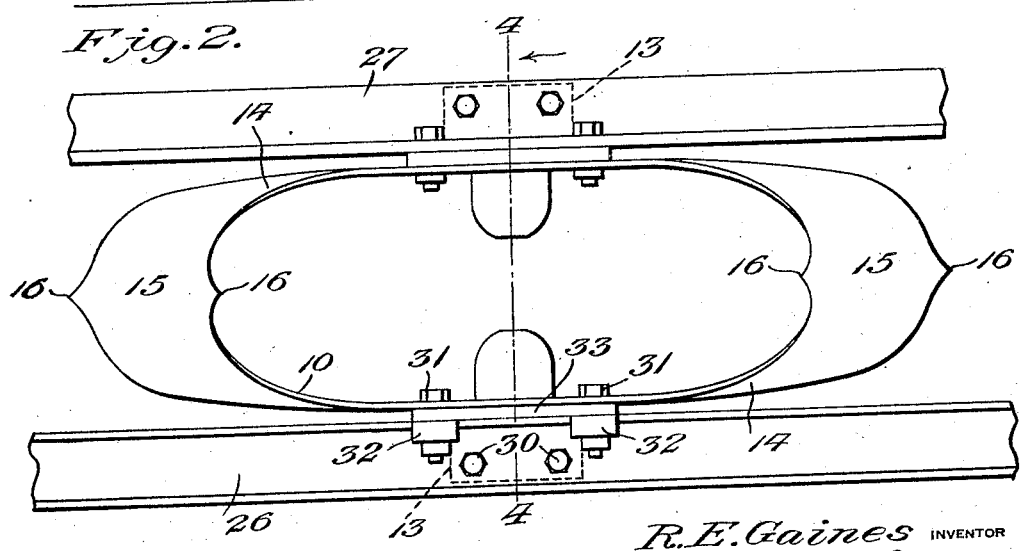
R. E. Gaines INVENTOR
BY Victor J. Evans
ATTORNEY
WITNESS:

R. E. GAINES.
SPRING.
APPLICATION FILED JUNE 4, 1920.
1,393,618. Patented Oct. 11, 1921.
2 SHEETS—SHEET 2.
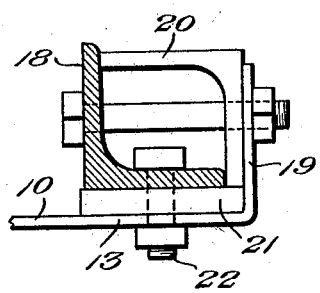
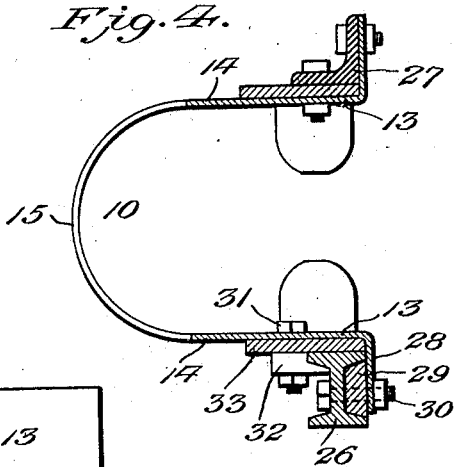
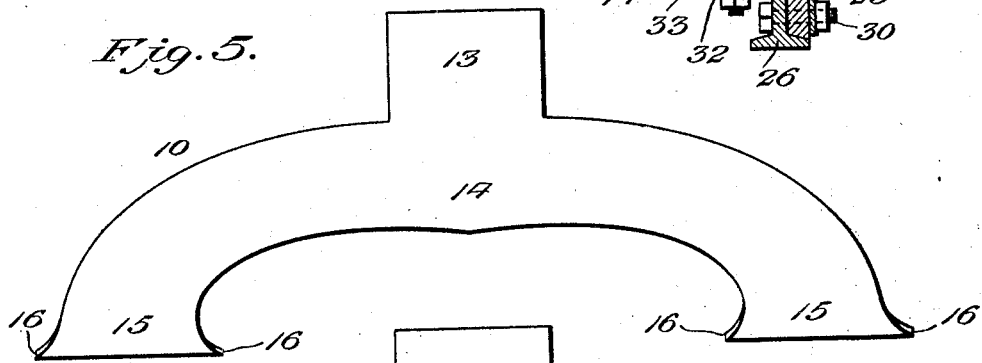
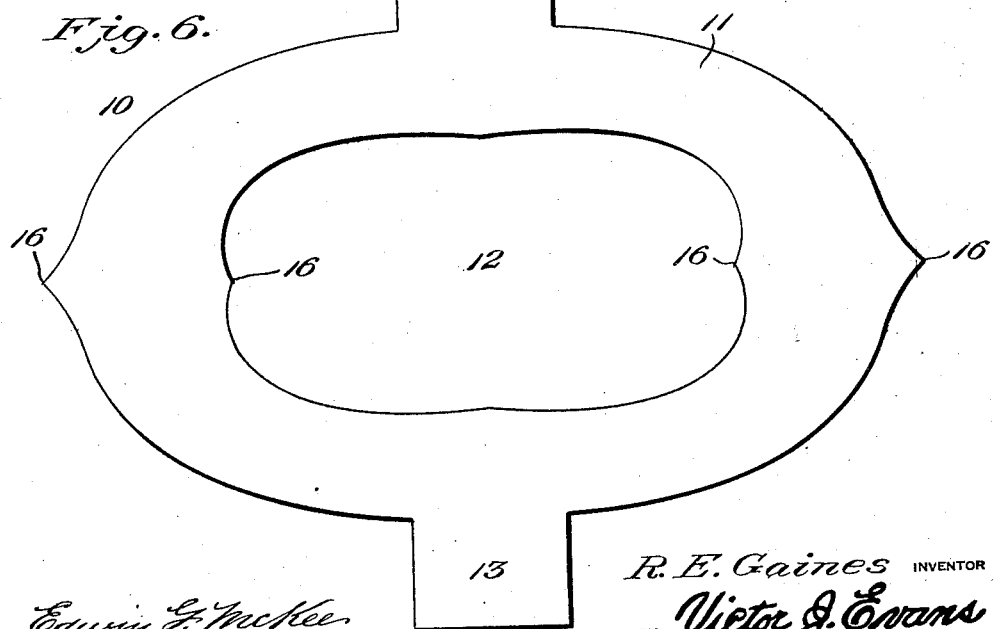
R. E. Gaines INVENTOR
BY *Victor J. Evans*
ATTORNEY
WITNESS:

UNITED STATES PATENT OFFICE.

ROY EDW. GAINES, OF EVANSVILLE, INDIANA.

SPRING.

1,393,618.  Specification of Letters Patent.  Patented Oct. 11, 1921.

Application filed June 4, 1920. Serial No. 386,456.

*To all whom it may concern:*

Be it known that I, ROY EDW. GAINES, a citizen of the United States, residing at Evansville, in the county of Vanderburg and State of Indiana, have invented new and useful Improvements in Springs, of which the following is a specification.

This invention relates to improvements in springs especially designed for use upon vehicles, such as automobiles, cars and the like, the object being to provide a simple, noiseless, strong and durable spring which will absorb the shock and which will extend to travel over rough roads and result in greater riding comfort and a reduction of wear upon the vehicle.

Another object is the provision of a spring which is formed of a single piece of resilient metal and shaped to provide offset attaching ears or lugs, whereby hinge motion is imparted to the spring when the latter is in use.

With the above and other objects in view, the invention includes the following novel features and details of construction, to be hereinafter more fully described, illustrated in the accompanying drawings and pointed out in the appended claims.

In the drawings:—

Figure 1 is a side elevation showing the chassis of a motor vehicle equipped with the improved spring.

Fig. 2 is a front elevation of the same.

Fig. 3 is an enlarged section on the line 3—3 of Fig. 1.

Fig. 4 is a similar view on the line 4—4 of Fig. 2.

Fig. 5 is a plan of the spring.

Fig. 6 is a plan view of the blank in which the spring is formed.

Referring to the drawings in detail, wherein like characters of reference denote corresponding parts, the spring which is indicated at 10 is formed of a single sheet of metal and is shaped as shown in Fig. 6 to provide a substantially elliptical member 11 having an opening 12 therein and oppositely extending lugs or projections 13. The member 11 is bent upon its longitudinal center to provide substantially parallel bowed resilient members 14 which are spaced apart and are connected by curved end members 15. These last mentioned members are positioned along one side edge of the members 14 and act as spring hinges to normally hold the members 14 separated to their maximum extent. The ends of the connecting members 15 are preferably pointed at opposite points as indicated at 16 to increase the strength of the spring at its points of greatest strain.

In Fig. 1, the spring is illustrated as connecting the rear axle 17 and the side bar 18 to the chassis. Various means may be employed for connecting the spring, the means shown consisting of bending the extremity of the upper projection or lug 13 in the manner indicated at 19 so as to form a right angled extension. The extremity of this extension is positioned behind the side member 18 and as this member is shown as formed of angle iron, a filler block 20 is provided and a bolt passed from the extremity of the right angled member, through the filler block and the side bar 18. A plate 21 is positioned between the extension or lug 13 and a bolt 22 passed through the extension, plate and side bar 18. The manner of connecting the side bar is governed by the character of the said bar and where the latter is formed of channel bar a different method of connection will be employed.

For the purpose of connecting the opposite extension or lug 13 and the axle 17, there is provided a block 23 which straddles the axle and has positioned thereon a plate 24, while a U shaped clip 25 passes beneath the axle and through openings provided in the saddle bar, the plate and the extension or lug 13.

In Fig. 2, the spring is illustrated as positioned transversely above the front axle 26, being connected to this axle and to a cross bar 27 of the chassis frame, the latter being herein shown as formed of an angle bar and the extension or lug 13 is connected to this angle bar in a manner previously described.

The axle 26 is shown as being formed of an I beam and a spring is connected thereto by bending the extremity of the extension or lug 13 at an angle as indicated at 28 and inserting a filler block 29 within the channel of the I beam and passing a bolt 30 through the beam, block and extremity 28 of the extension or lug 13. A bolt 31 is passed directly through the extension or lug and is provided with a clip 32 which engages the I beam, a relatively wide plate 33 being positioned between the extension or lug 13 and the edge of the I beam, If desired, the spring may be positioned longitudinally of the vehicle upon either end of the front axle 26.

The invention is susceptible of various changes in its form, proportions and minor details of construction and the right is herein reserved to make such changes as properly fall within the scope of the appended claims.

Having described the invention what is claimed is:—

1. A spring formed from a single piece of resilient sheet metal shaped to provide a substantially elliptical shaped body having a central opening therein and bent to provide spaced bowed resilient members and resilient end members connecting the bowed members at one side edge of the latter and attaching lugs extending from the opposite side edges of the bowed members.

2. A spring embodying a substantially elliptical shaped body having a central opening therein and bent to provide spaced bowed resilient members and resilient end members connecting the bowed members at one side edge of the latter and attaching lugs extending from the opposite side edges of the bowed members.

3. A vehicle spring made up of upper and lower spaced resilient bars, and resilient end portions bowed transversely to the length of the resilient bars and joined at their ends to and extending laterally therefrom.

4. A vehicle spring made up of upper and lower spaced resilient bars, and resilient end portions bowed transversely to the length of the resilient bars and joined at their ends to and extending laterally therefrom; the said spring being formed of a sheet of metal.

In testimony whereof I affix my signature.

ROY EDW. GAINES.